United States Patent [19]
O'Reilly et al.

[11] 3,887,153
[45] June 3, 1975

[54] ATTACHMENTS FOR UNLOADING DEVICES

[76] Inventors: Daniel W. O'Reilly; Joseph D. O'Reilly, both of Rt. No. 3, Goodhue, Minn. 55027

[22] Filed: Nov. 5, 1973

[21] Appl. No.: 412,690

[52] U.S. Cl. ............... 239/676; 239/680; 239/682; 222/176; 222/386; 214/82; 296/39 R
[51] Int. Cl. ....................... A01c 19/00; E01c 19/20
[58] Field of Search ........ 222/176, 178, 334, 386.5, 222/386, 203; 214/82, 29, 83.3, 44 R; 296/28 D, 39 R; 239/650, 662, 672, 676, 679, 680, 681, 682, 684

[56] References Cited
UNITED STATES PATENTS

| | | | |
|---|---|---|---|
| 1,879,114 | 9/1932 | Grumb et al. | 239/680 |
| 1,900,299 | 3/1933 | Oppenheim | 239/680 X |
| 2,263,748 | 11/1941 | Webb et al. | 239/678 |
| 2,518,802 | 8/1950 | Markel | 239/680 |
| 2,788,136 | 4/1957 | Herbert et al. | 214/44 R X |
| 2,984,850 | 5/1961 | Law et al. | 214/83.3 X |
| 3,682,333 | 8/1972 | Krause | 214/82 |

FOREIGN PATENTS OR APPLICATIONS

| | | | |
|---|---|---|---|
| 1,439,762 | 4/1966 | France | 296/39 R |

Primary Examiner—Robert S. Ward, Jr.
Attorney, Agent, or Firm—Jacobson and Johnson

[57] ABSTRACT

A sidewall attachment for unloading devices which are used for unloading bulk material from a boxlike enclosure in a uniform and controlled manner in which there is included a flexible attachment for the sidewalls of the boxlike enclosure which coacts with a scraper unit to produce a scraping and rippling action which keeps the sidewalls free of bulk material.

9 Claims, 12 Drawing Figures

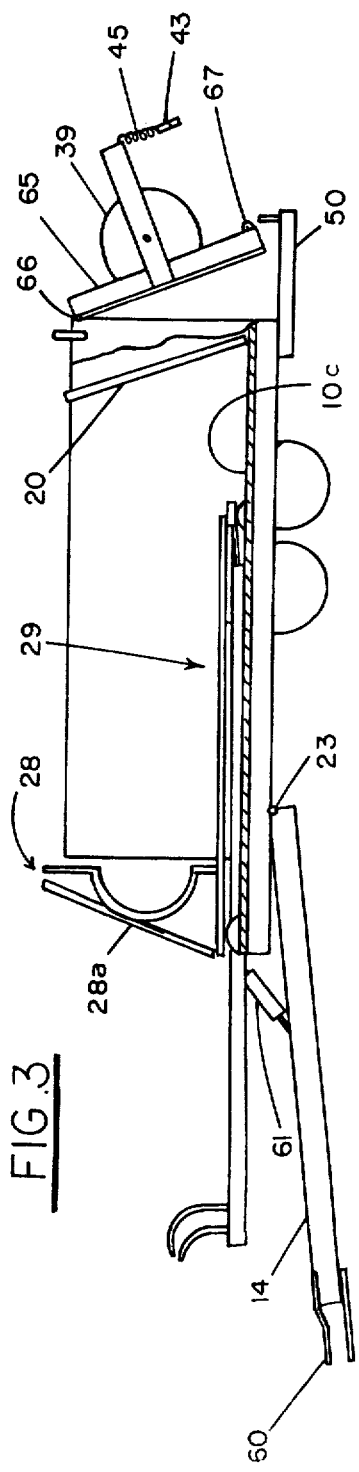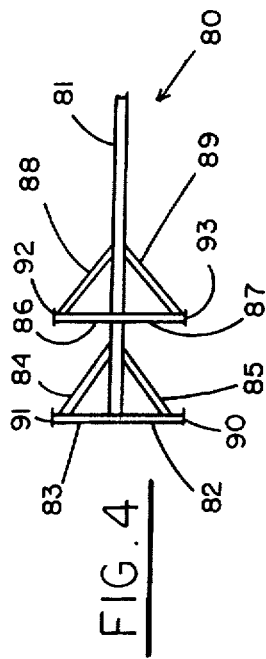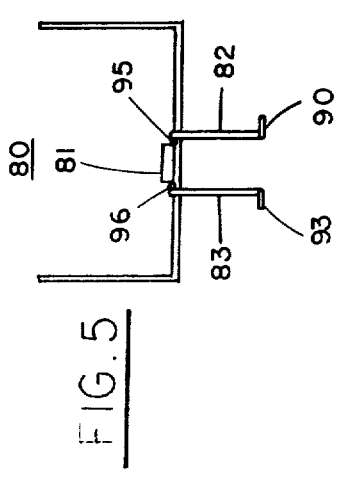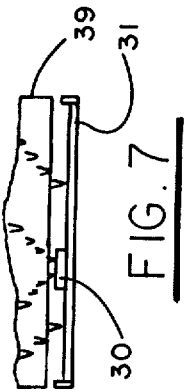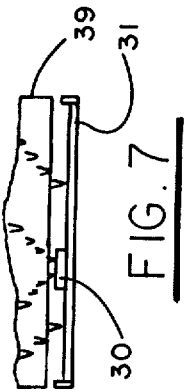

ATTACHMENTS FOR UNLOADING DEVICES

BACKGROUND OF THE INVENTION 1.

Field of the Invention

This invention relates generally to attachments to sidewalls of devices for unloading bulk material and, more specifically, to a flexible sidewall attachment useable for unloading bulk material such as manure and the like.

2. Description of the Prior Art

The concept of unloading bulk materials with powered vehicles such as manure spreaders is well known in the art. Typically, the unloading units include a pusher such as an endless chain or a cable actuated false end gate for forcing the bulk material to the one end of the box on the vehicle. For example, a typical manure spreader usually contains a pair of endless chains with slats therebetween which slide along the bottom of the spreader box. The slats pull the manure into a rotating beater which spreads the manure over the field. Still another embodiment of the manure spreader is shown in the Webb et al. U.S. Pat. No. 2,263,748 which shows a sliding end gate pulled along the spreader box by a pair of cables. Similarly, another type of unloading device is shown in the Glass patent No. 3,211,308. The Glass patent also shows a system of cables for pushing material to the front of the forage box. These are typical of prior art unloading devices and boxes available and in use for unloading bulk material such as forage and manure.

one of the problems with virtually all of the box type spreaders is the buildup of material which occurs on the sidewalls of the spreader. The buildup occurs because it is extremely difficult to scrape the sidewalls of a spreader to get them clean. The buildup of material creates a problem in both the summer use and the winter use of the spreader. In the summertime, the buildup generally causes a decrease in the internal dimensions of the box which may result in sticking or binding of the pusher. In the winter time, the problem is more severe in that natural buildup is assisted by freezing which causes material to also freeze to the sides. When the weather warms up, some of the excess buildup will melt and run to the bottom of the spreader where it freezes again. This can freeze up the spreader rendering it virtually unuseable until the warm weather returns.

With all these prior art types of unloading devices, the spreader box is basically a wood or metal box for confining the bulk material. The present invention includes a sidewall attachment for the spreader box which works particularly well with the unloading devices using a false end gate for pushing material out of the spreader.

Other features have been included in the spreader provide means for adjusting the horizontal position of the load to eliminate problems of spreading manure on slopes.

Another feature of the invention is that the spreader with the side wall attachments can better accommodate loose manure as well as manure containing large amounts of bedding.

Another feature of the invention is the use of a hydraulic system to power the unloading of the manure.

Another feature of the invention is the means for preventing the unit from freezing during cold weather.

Still another feature of the invention is the unique power coupling unit between the tractor and the beater. The other features of the invention will be described hereinafter.

BRIEF SUMMARY OF THE INVENTION

Briefly, the present invention comprises a flexible side wall attachment members for a spreader box. The preferred embodiment includes a pair of flexible side wall attachments which are fastened to the sides of a boxlike member for receiving bulk material, a pusher member which pushes against the bulk material and scrapes against the flexible sidewall to maintain the side walls in a clean condition by a combination of the scraping and rippling action.

BRIEF DESCRIPTION OF THE DRAWINGS

Referring to the drawings.

FIG. 3 shows a side elevation view of my spreader with the side cut away to reveal the functional internal parts of my spreader;

FIG. 4 is a top view of one embodiment of my pusher member which prevents compaction of the bulk material;

FIG. 5 is an end view of FIG. 4 showing the folding arms in one embodiment of the pusher member;

FIG. 6 shows the guard members for repositioning the foldable pusher arms;

FIG. 7 shows the arrangement of the beater teeth with respect to my pusher member;

DESCRIPTION OF THE PREFERRED EMBODIMENT

Figure 3B:
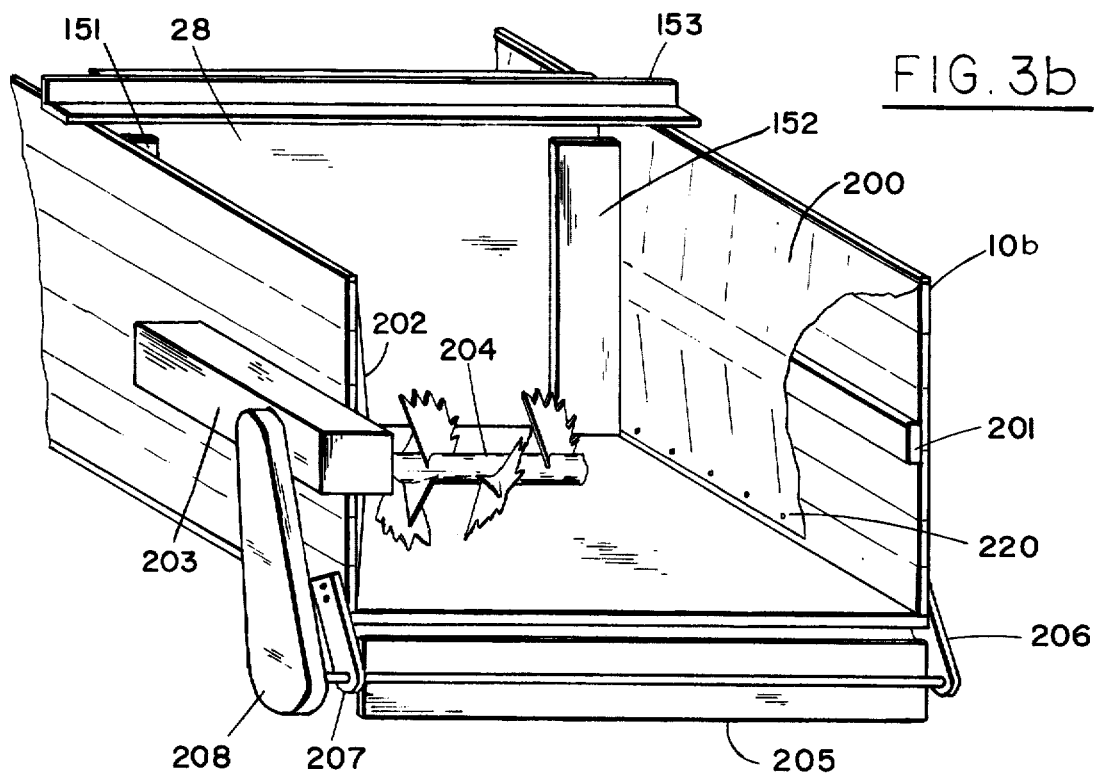
FIG. 3b is a perspective end view of a spreader box having my flexible side wall attachments.
Figure 3C:
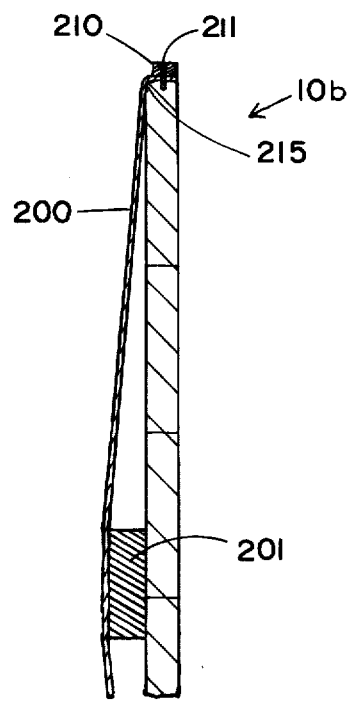
FIG. 3c is an end view of a portion of the spreader box and my side wall attachment member.

Referring to FIG. 3b and FIG. 3c of the drawing, reference numeral 10b identified one side wall of a spreader box. Attached to side wall 10b is my flexible side wall attachment member 200 which is shown held in a spaced relationship from spreader side wall 10b by a central compressible or resilient member 201. Typically, compressible member 201 may be closed cell sponge rubber, however, no limitation is intended thereto. The top of flexible member 200 is held against the top edge of side wall 10b by a strip 210 and screws 211. In the preferred embodiment, the top of flexible sheet 200 is tightly held against the top of side wall 10b to prevent moisture or material from falling between flexible side wall attachment 200 and side wall 10b. The bottom of my flexible side wall attachment member 200 is fastened to side wall 10b by spaced members such as flathead nails or the like. The purpose of the spaced members is to provide for air openings at the bottom of the flexible side wall attachment member which allows air to escape from between side wall attachment member 200 and side wall 10b. Similarly, located on the opposite side of the spreader is another flexible side wall attachment member 202 which performs an identical function as side wall attachment member 200 and therefore will not be described herein. Similarly, the ends of side wall attachment member are fastened to allow air to escape as the pusher passes over the flexible side wall attachment member. Flexible side wall attachment member 200 is held in a spaced relationship from spreader side wall 10b by a compressible or resilient member 201, however, it is not necessary for the invention to have a compressible member 201 but it is preferred to have a member that will hold flexible side wall attachment in a somewhat spaced relationship from side wall 10b.

In operation of the spreader, the pusher member or sliding false end gate 28 includes a non-abrasive scraper member 151 on one side and a similar non-abrasive scraper member 152 on the opposite side which are forced along the side wall attachment members 202 and 200. Scraper members 151 and 152 are made from flexible material such as belting, plastic, or the like, and do not contain any sharp edges which would catch on the flexible side wall attachment members. The flexible side wall attachment member is preferably made from a plastic polymer material such as polyvinyl chloride or polyethylene. However, no limitation to these materials is intended.

The present invention prevents the build up of material on the spreader side wall by the coaction of members 152 and 151 and flexible side wall attachment members 200 and 202. For example, as flexible member 152 moves back and forth along side wall attachment member 200, it produces both a rippling action and a scraping action along the side wall attachment member 200. This combined action has been found to be extremely effective in removing any residue or materials which would cling to the side of the box. While my side wall attachment members can be rigidly mounted to the side walls of the spreader, it has been found there is a better cleaning action if there is some slack or looseness in the flexible sheet as this produces a rippling action as well as a scraping action.

One of the problems with the conventional spreader boxes utilizing false end gates is a tendency of the center of the boxes to bow outward. If the box bows outward, a conventional straight edge scraper on the false end gate cannot maintain the side walls of the spreader clean. In contrast, the present invention maintains the spreader side wall members clean to prevent build up of materials on the spreader side walls even if the box bows out slightly. More specifically, one of the problems with the prior art spreader devices including those that use chains for unloading the material is that build up occurs along the side wall of the spreaders. During winter use it freezes to the spreader side wall. As the material continues to freezes to the spreader box, the box gets smaller and smaller to create binding problems with the unloading device. However, the more important problem is that if the weather warms up on a particular day, the build up on the sides may partially melt and run down to the bottom of the spreader where it freezes. When it freezes to the bottom of the spreader, it usually freezes the pusher gate or unloading chains to the spreader. If one were to engage the spreader with the unloading device frozen, one would break the unloading device. The present invention solves this problem by eliminating the build up along the sides by use of the flexible members 200 and 202 located attached to the side wall member of the spreader.

Another feature of the present invention is a splash beater 205 which is powered from gear box 203 by a chain located under guard 208. Splash beater 205 is held in position by brackets 207 and 206. The splash beater 205 is powered from the same power source as main beater 204. The purpose of splash beater 205 is to handle any loose materials coming out of the unloading device. For example, the loose or liquid type materials tend to flow out underneath the main beater, however, with the present invention, the liquid or semiliquid type of materials will fall onto the rotating splash beater 205 and which will disburse the material over the field as well as immediately under the spreader.

In the preferred embodiment, the material used for flexible side wall attachment member can be polyvinyl chloride or polyethylene. I have found a minimum thickness approximately three thirty-seconds inches has worked extremely well for these type of materials. The polymer plastics are preferred because of their slipperiness, however, other flexible materials can be used which are able to withstand the environmental conditions normally encountered in winter and summertime use of the spreaders.

While the heart of the present invention is a flexible side wall attachment member for use with various types of unloading devices, the invention is best utilized with the spreader shown and described hereinafter.

Figure 1:
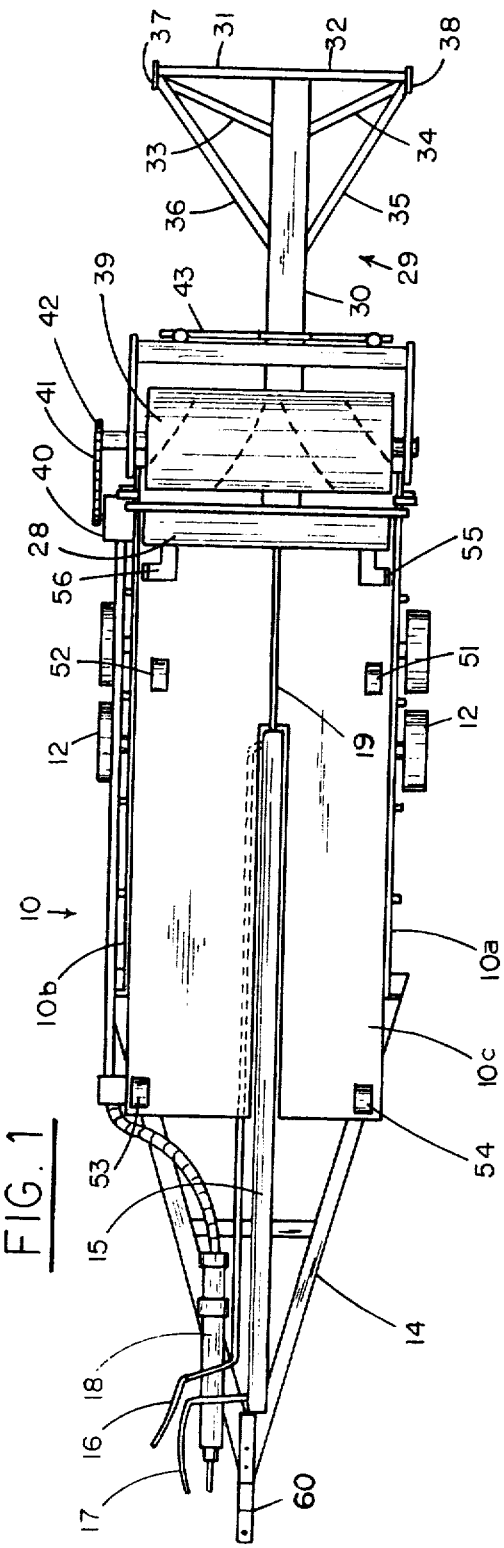
FIG. 1 shows a top view of my spreader.
Figure 2:
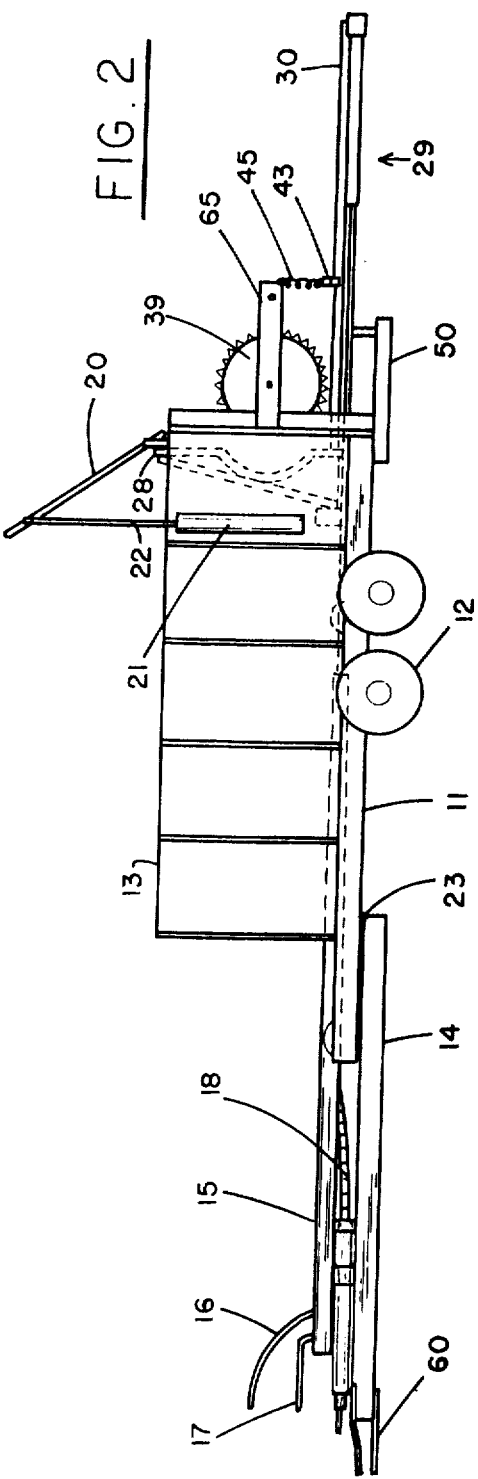
FIG. 2 shows a side elevation view of my spreader.

With reference to the remaining drawings, the preferred type of spreader for use with the present invention will be described more specifically. FIG. 1 and FIG. 2, reference numeral 10, generally designates a bulk loading device in which the preferred embodiment is a manure spreader. While the invention is described as an attachment to side walls of a manure spreader, it is apparent that the side wall attachments for my spreader can be used for unloading materials which have the bulk characteristics of manure as well, for example, lime or forage material could also be unloaded with my spreader. The spreader comprises a main frame 11 which has wheels 12 mounted thereon for rotatably supporting spreader 10 thus allowing spreader 10 to be transported over open fields. Pivotally attached to main frame 11 by pivot bolts 23 is a front frame 14 which contains a hitch 60 for connection to a pulling device such as a farm tractor. Spreader 10 includes a box comprised of side walls 10a and 10b, a bottom 10c, and a pair of end gates 20 and 28. Preferably, the prior art boxes are made from wood to prevent rapid freezing of bulk material to the box which occurs with the use of metal boxes. In an alternate embodiment of the invention, I use an inside and outside wood box with a layer of insulation therebetween to lessen the opportunity for the manure to freeze to the side walls.

In the loading position, end gate 28 is located in the front of the spreader 18, however, in FIG. 1, end gate 28 is shown in the extended position or unloaded position. A rear end gate 20 is provided which is powered by hydraulic cylinder 21 and extendible arm 22. Rear end gate 20 prevents the manure from falling into the beater during the loading process. When the spreader is in operation, end gate 20 is raised to the position shown in FIG. 2 by applying a signal to hydraulic cylinder 21 to cause arm 22 to become extended. In order to simplify the drawing, only one cylinder 21 is shown, however, in practice it is preferred to have one cylinder on each side of the spreader. Also, in an attempt to simplify the drawings, the end gate 20 and hydraulic cylinders have been omitted from FIG. 1.

The beater which contains teeth or spikes for spreading the manure is designated by reference numeral 39 and is powered from a tractor through a power take-off shaft 18, a gear box 40, a chain drive 41 and a spur gear 42 located on the shaft supporting beater 39.

Referring to FIGS. 1, 2 and 3, the power mechanism for unloading the bulk material from the box comprises a hydraulic cylinder 15 which is powered through hydraulic lines 16 and 17. The advantage of my hydraulic cylinder is that the motion and the pusher members can easily and quickly be controlled by the tractor operator as well as provide a uniform unloading device. The hydraulic cylinder 15 contains an extendible rod 19 that attaches to my pusher member. Bottom 10c contains an opening so that a portion of cylinder housing 15 and 19 can extend therethrough so rod 19 can be attached to pusher member 29. Attachment to pusher member 29 is preferably made at the end of member 30 by a clevis or pin. Thus, in the event of breakdown the load can be unloaded by extending rod 29. The purpose of the opening around cylinder 15 is to allow any material behind the end gate to fall through the opening when the end gate is returned to a front position. Pusher member 29 actually comprises two members which are fastened together and simultaneously powered by hydraulic cylinder 15. The first pusher member is end gate 28 which extends upward in a vertical position to push on the bulk material and the second member is pusher member 29 which extends in a horizontal direction into the bulk material in spreader 10. End gate 28 is shown with a curved section and a covering shroud 28a to better facilitate the unloading of the bulk material as the end gate approaches the beater 39. In the extended position of end gate 28, the lower edge of end gate 28 extends slightly beyond the lip of the box to insure that all the bulk material is pushed out of the box during the unloading operation.

In FIGS. 1 and 2, the pusher members are shown in the extended position while in FIG. 3 the pusher members are shown in the retracted position. Second pusher member 29 comprises a straight section 30, a pair of arms or wing bars 31 and 32 that extend out from member 30. Arms 31 and 32 are braced for support by members 33, 36, 34 and 35, respectively. Located at the end of arm 31 is a guide shoe 37 and similarly located at the end of arm 32 is a guide shoe 38. Also located on the end gate 28 are guide shoes 55 and 56. The purpose of guide shoes is to maintain the orientation of the pusher members with respect to the spreader box by engaging the side walls of the spreader 10 and thereby prevent twisting of the pusher member when hydraulic cylinder 19 is actuated. It is this second pusher member 29 in conjunction with end gate 28 which extends into the bulk material and has been found to prevent compaction of the bulk material as well as prevent the spillage of material over the sides of the box. The operation is not fully understood but it is believed that the support members tend to direct the bulk material away from the sides of the spreader thus reducing the side wall friction and eliminating the spillage over the sides. In addition, the center member 30 and the arms and supports also partially support the load of bulk material.

Located within the box spreader 10 is a set of antifreeze blocks 51, 52, 53, and 54. These blocks which are small ramps provide for elevation of the pusher members during storage. The blocks lift and maintain the pusher mechanism off the floor of the spreader so that the pusher members 28 and 29 cannot freeze to the bottom of the spreader.

The only part of the pusher mechanisms which can freeze are those points in contact with the antifreeze blocks, however, since the surface area is quite minimal, one can easily free the pusher members by applying a signal to power cylinder 15.

Figure 3A:
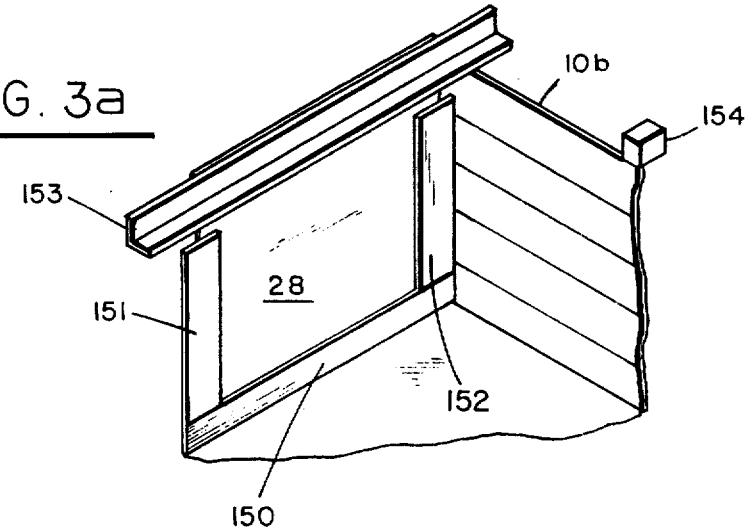
FIG. 3a is a perspective view of my end gate and side wall scrapers.

Referring to FIG. 3a, reference numeral 28 indicates the end gate and reference numeral 10b indicates one side of the box. This detail reveals two additional features of the invention, namely, scrapers 150, 151 and 152. These scrapers are flexible enough to prevent binding of end gate against the walls of the box but stiff enough to bend backward and now allow the bulk material to slip past end gate 28. A typical suitable material is rubber, belting plastic, or the like.

Located on top of end gate 28 is a channel iron 153 which serves a dual function. The first function is to scrape the top edges of the box to remove any bulk material that falls thereon. The second purpose is to coact with stop 154 to prevent end gate 28 from accidentally engaging beater 39.

Referring to FIG. 3, the operation of the unit will become more apparent. In FIG. 3, the false end gate 28 or first pusher member is shown in its front position storage position. In the storage position, the pusher members are resting on the antifreeze blocks which comprise ramped blocks. However, prior to loading the pusher members are displaced slightly rearward so that the bottom of the pusher members rest on the bottom 10c of spreader 10. This is called the loading position. It is apparent that in the loading position, the second pusher member 29 is located about in the middle of spreader 10. In loading the bulk material is dumped on top of second pusher member 29. The bulk material is held in confinement by false end gate 28, the side wall 10a and 10b and the rear end gate 20. When the spreader has been loaded and ready for spreading, one can raise end gate 20 so that the bulk material can be forced into beater 39. While I show a rear end gate 20, it is apparent that end gate need only be used for bulk materials which are sloppy and would tend to spill out of the spreader during loading.

Further features of the spreader which are shown in FIG. 3 are the concept of my break away beater housing 65, which is pivotally fastened to spreader 10 by pivot member 66. The bottom of beater housing 65 is held in contact with the rear of spreader 10 through a set of break away pins 67 which are located on both sides of spreader 10. FIG. 3 shows the breakaway pin broken. The purpose of break away pin 67 is so that if there should be hard material or frozen material in the spreader, the pusher members will not break the beater by forcing the frozen material into the beater but instead would break the break away pins thus allowing the beater to swing free without any damage thereto. In addition, the pivot members may be removed to allow the use of the box for unloading without spreading.

Another aspect of my spreader shown in FIG. 3 is the tiltable bed comprised of frame 11 and frame 14 which has a hydraulic cylinder 61 that connects to frame 11. By extending or retracting cylinder 61, one can tilt the bed of spreader 10 to the desired position. Thus, the operator can adjust the spreader for going downhill or uphill.

Another feature of the spreader shown in FIGS. 1, 2 and 3 is guide or support 50 for pusher member 29. Support 50 provides vertical support to arm 30 as it extends beyond the rear of the spreader. In addition, I provide a scraper 43 which fastens to frame 65 through a pair of helical springs 45. The helical springs hold the edge of scraper 43 against the top portion of pusher member 29 as well as allow the scraper member to flex inward or outward. That is, as pusher member 29 moves outward, helical springs 45 allow sraper 43 to flex rearward as well as upward. This enables scraper 43 to always maintain pressure contact with the member 30 and thereby scrape any loose material off member 30. Member 30 has been shown as flat with a top parallel to bottom 10c of spreader 10. However, in an alternate embodiment, member 30 has a cross sectional shape of an isosceles triangle to allow the bulk material to slide off by gravity.

Referring to FIG. 4, an alternate embodiment of my wing bars or second pushing member 29 is designated by reference numeral 80. Wing bar 80 is substantially the same as the pusher shown in FIG. 1 except that the member 81 contains a pair of wing bars or pushing members which extend into the bulk material. The unit comprises arms 81 and 86, angle supports 88 and 89 and arms 82 and 83 and angle supports 84 and 85. Both of these members have guide shoes as indicated by reference numerals 91 and 92, 90 and 93. Thus, a modification of the spreader is the use of two wing bars for extending into the bulk material to provide more contact with the bulk material.

In addition to the modification of the wing bars by use of two members, FIG. 5 shows an additional modification of pivotal mounting arms 82 and 83 to member 81 by hinges 95 and 96. With this embodiment, arms 82 and 83 fall downward after having passed under the beater thus eliminating the need for a scraper.

A reference to FIG. 6 shows how a wing bar would appear in a side view. Note arm 103 and angle support 104 are fastened by hinges 105 and 106 to member 102 which could be substituted for member 30. Also, a roller guide 101 is located at the rear of the spreader 10 to engage angle support arm 104 to gradually lift the wing bar up to the horizontal position for pulling into the spreader.

FIG. 7 shows an end view of the wing bars and beater to illustrate that the teeth are shorter in the region that passes over member 30. This allows one to maintain a uniform minimum clearance under the entire length of the beater.

Figure 8:
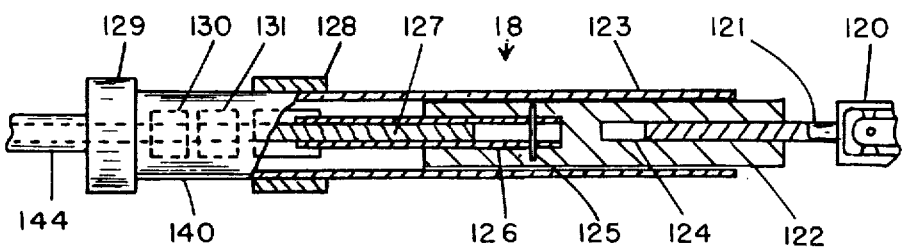
FIG. 8 shows a cross-sectional view of my flexible drive shaft mechanism.
Figure 9:
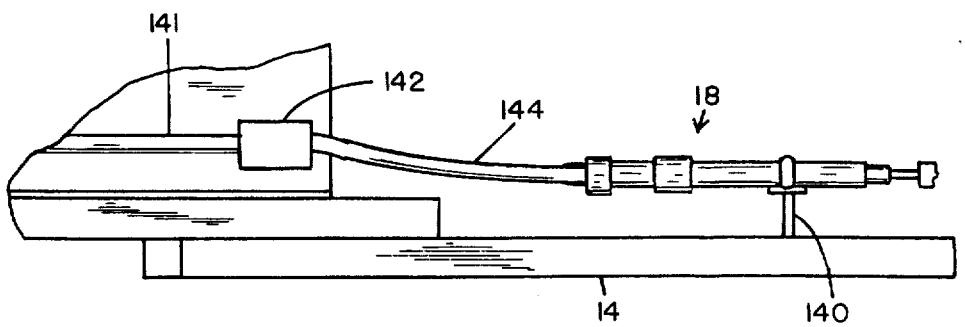
FIG. 9 shows the mounting of the flexible drive shaft on the frame of my manure spreader.

Referring to FIG. 8, my novel flexible drive mechanism 18 from the tractor to spreader beater 39 is shown in cross section. The drive unit comprises a rigid shaft 141 that runs through a transfer box 142, a wire cable 127 which runs through a curved housing 144 connecting to unit 18 which is pivotally mounted to frame 14 by support 140. More specifically, the unit 18 comprises a housing 123, a conventional power take-off shaft 120, a spline shaft 121 for fitting into a splined opening 124 located in member 122. Splined shaft 121 is allowed to slide within member 122 and thus compensate for any variations in hookup of the spreader to the tractor. Located on the other end of member 122 is another opening which contains a pipe 126 which is pinned to member 122 by a pin 125. Located inside pipe 126 is a portion of my flexible steel wire cable 127 which is brazed to the pipe to form integral engagement with pipe 126. The flexible cable 127 extends through a section of a flexible hose 140 comprised of a sleeve with a coil spring on the outside and into housing 144 which fastens to the gear box 142. Located within the flexible hose section 140 are bushings 130 and 131 which prevent the flexible wire cable from rubbing against flexible hose 140.

The purpose of the flexible mechanism 18 as shown in FIG. 8 is to allow for contraction of the cable as one applies the load by allowing member 122 to slide within housing 123. That is, as one applies torque to the power take-off shaft 121, flexible cable 127 tightens up thus causing the cable to shorten. Thus, the present drive mechanism allows for this contraction or shortening of the cable without providing an undue torque to the housing itself. I have found that this arrangement will operate exceedingly well under rpm conditions of as high as 1,000 rpm and thus replace conventional universal type connections.

Thus, it will be apparent that my machine is much simpler and easier to repair and adjust than prior art spreaders. For example, if one wishes to adjust the rate of discharge of the bulk material by controlling the speed of the end gate, all one has to do is adjust the amount of hydraulic fluid supplied to hydraulic cylinder 15 by either inserting a different orifice into the hydraulic line or use available supply hydraulic valve.

One other feature of my flexible drive shaft is that I have discovered to utilize a flexible shaft under load conditions of 25 to 30 horsepower, it is necessary to have a flexible cable in which the twist of the strands of the cable is in the same direction as the lay or twist of the strands around the core of the cable. Typically, I can use a 1 inch flexible shaft to transmit up to 30 horsepower in contrast to available prior art flexible shafts which are unable to handle these horsepower requirements without unraveling.

I claim:

1. An attachment for the surface of an unloading device for unloading bulk material which has a tendency to adhere to the surface of the unloading device comprising:
   a container member for receiving bulk material and having means for confining the bulk material therein;
   a flexible member attached to said means for confining the bulk material therein;
   a pusher member mounted in said container member for forcing the bulk material out of said container member, said pusher member including a pliable scraper member for sliding along said flexible member to thereby clean the flexible member as the pusher member slides along said flexible member.

2. The invention of claim 1 wherein said flexible member is spaced sufficiently from said means for confining the bulk material to produce a rippling action when said pusher member slides along said flexible member.

3. The invention of claim 1 including a splash beater for spreading the bulk material in an open field.

4. The invention of claim 1 including flexible members located on said pusher member to prevent said pusher member from binding in said container member.

5. The invention of claim 2 wherein said container member comprises a spreader box and said means for confining the bulk material comprises a pair of side walls each having a top and bottom.

6. The invention of claim 5 wherein each of said flexible members is sealed to the top of said side wall member to prevent moisture from entering therein.

7. The invention of claim 6 wherein each of said flexible members is spaced from said side wall by a compressible member.

8. The invention of claim 7 wherein said flexible member comprises a polymer plastic material.

9. The invention of claim 8 wherein said material has a minimum thickness of three thirty-seconds of an inch.

* * * * *